(12) United States Patent
Venkataramani et al.

(10) Patent No.: US 6,990,797 B2
(45) Date of Patent: Jan. 31, 2006

(54) METHODS AND APPARATUS FOR OPERATING GAS TURBINE ENGINES

(75) Inventors: Kattalaicheri Srinivasan Venkataramani, West Chester, OH (US); Lawrence Butler, Cincinnati, OH (US); Ching-Pang Lee, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 104 days.

(21) Appl. No.: 10/656,518

(22) Filed: Sep. 5, 2003

(65) Prior Publication Data

US 2005/0050877 A1 Mar. 10, 2005

(51) Int. Cl.
*F02C 7/0472* (2006.01)
*F02K 3/04* (2006.01)

(52) U.S. Cl. .......................... 60/204; 60/226.1; 60/267; 60/39.093; 244/134 R

(58) Field of Classification Search ................... 60/204, 60/772, 730, 267, 226.1, 806, 39.093; 244/134 R, 244/134 B; 415/114
See application file for complete search history.

(56) References Cited

U.S. PATENT DOCUMENTS

| | | | | |
|---|---|---|---|---|
| 2,474,258 A | * | 6/1949 | Kroon | 60/39.093 |
| 2,709,892 A | * | 6/1955 | Martin | 60/39.093 |
| 3,116,789 A | * | 1/1964 | Kent | 60/39.093 |
| 3,123,283 A | * | 3/1964 | Leis | 60/39.093 |
| 3,262,636 A | * | 7/1966 | Palfreyman | 60/39.093 |
| 3,355,883 A | * | 12/1967 | Beam, Jr. | 60/806 |
| 3,621,908 A | * | 11/1971 | Pravda | 415/114 |
| 3,651,645 A | * | 3/1972 | Grieb | 60/728 |
| 3,756,020 A | * | 9/1973 | Moskowitz et al. | 60/760 |
| 3,981,466 A | * | 9/1976 | Shah | 60/39.093 |
| 4,075,845 A | | 2/1978 | Allen | |
| 4,275,603 A | | 6/1981 | Kalocsay | |
| 4,333,309 A | * | 6/1982 | Coronel | 60/39.093 |
| 4,688,745 A | * | 8/1987 | Rosenthal Herman A. | 60/39.093 |
| 4,782,658 A | * | 11/1988 | Perry | 60/39.093 |
| 4,783,026 A | * | 11/1988 | Rumford et al. | 60/39.093 |
| 5,125,597 A | | 6/1992 | Coffinberry | |
| 5,136,837 A | | 8/1992 | Davison | |
| 5,143,329 A | | 9/1992 | Coffinberry | |
| 5,934,617 A | | 8/1999 | Rutherford | |
| 6,027,078 A | * | 2/2000 | Crouch et al. | 244/130 |
| 6,158,237 A | | 12/2000 | Riffat et al. | |
| 6,194,685 B1 | | 2/2001 | Rutherford | |
| 6,241,189 B1 | | 6/2001 | Porte | |
| 6,279,856 B1 | | 8/2001 | Rutherford et al. | |
| 6,330,986 B1 | | 12/2001 | Rutherford et al. | |
| 6,442,944 B1 | * | 9/2002 | Skur, III | 60/782 |
| 6,457,676 B1 | | 10/2002 | Breer et al. | |
| 6,510,684 B2 | * | 1/2003 | Matsunaga | 60/39.511 |
| 6,561,760 B2 | * | 5/2003 | Wadia et al. | 60/39.093 |

FOREIGN PATENT DOCUMENTS

| | | |
|---|---|---|
| GB | 879621 A | 10/1961 |
| GB | 1012909 A | 12/1965 |
| GB | 1148206 A | 4/1969 |
| GB | 2136880 * | 9/1984 |
| JP | 62070651 A | 4/1987 |

* cited by examiner

*Primary Examiner*—Ted Kim
(74) *Attorney, Agent, or Firm*—Armstrong Teasdale LLP; William Scott Andes

(57) ABSTRACT

A method facilitates assembling a turbine engine to facilitate preventing ice accumulation on the turbine engine during engine operation. The method comprises coupling at least one heat pipe to the engine such that a first end of the at least one heat pipe is coupled in thermal communication with a heat source, and coupling a second end of the at least one heat pipe in thermal communication with an outer surface of an engine component that is upstream from the heat source.

18 Claims, 4 Drawing Sheets

METHODS AND APPARATUS FOR OPERATING GAS TURBINE ENGINES

BACKGROUND OF THE INVENTION

This invention relates generally to gas turbine engines, and more particularly, to methods and apparatus for operating gas turbine engines.

Gas turbine engines typically include low and high pressure compressors, a combustor, and at least one turbine. The compressors compress air which is channeled to the combustor where it is mixed with fuel. The mixture is then ignited for generating hot combustion gases, and the combustion gases are channeled to the turbine(s) which extracts energy from the combustion gases for powering the compressor(s), as well as producing useful work to propel an aircraft in flight or to power a load, such as an electrical generator.

When engines operate in icing conditions, i.e., exposed to clouds of super-cooled water droplets, ice may accumulate on exposed external engine structures. More specifically, if engines are operated within icing conditions at low power for extended periods of time, ice accumulation within the engine and over exposed engine structures may be significant. Over time, continued operation of the engine, or a throttle burst from lower power operations to higher power operations, or vibrations due to either turbulence or asymmetry of ice accretion, may cause the accumulated ice build-up to be ingested by the high pressure compressor. Such a condition, known as an ice shed, may cause the compressor discharge temperature to be suddenly reduced. In response to the sudden decrease in compressor discharge temperature, the corrected core speed increases in the aft stages of the high pressure compressor. This sudden increase in aft stage corrected core speed may adversely impact compressor stall margin. In extreme cases, it may also lead to an engine flame out.

To facilitate preventing ice accretion within the engine and over exposed surfaces adjacent the engine, at least some known engines include a control system that enables the engine to operate with an increased operating temperature and may include sub-systems that direct high temperature bleed air from the engine compressor to the exposed surfaces. However, the increased operating temperature and the bleed systems may decrease engine performance. Such systems may also require valves to turn off the flow of the high temperature air during take-off and other high power operations to protect the engine. In addition to the increased cost, such valving may pose a reliability problem. As such, to further facilitate preventing ice accumulation at least some known engines are sprayed with a deicing solution prior to operation. However, during flight and over time, the effectiveness of the deicing solution may decrease. More specifically, during engine operation, evaporative cooling may still cause freezing and ice accumulation over external engine surfaces, such as a front frame of the engine. Conventional electrical heating is an option, but it requires large quantities of electricity for performing the de-icing operation and may require additional electrical generators, electrical circuits and complex interaction logic with the airplane's computers with the attendant increased cost, weight and performance penalties.

BRIEF SUMMARY OF THE INVENTION

In one aspect, a method for assembling a turbine engine to facilitate preventing ice accumulation on the turbine engine during engine operation is provided. The method comprises coupling at least one heat pipe to the engine such that a first end of the at least one heat pipe is coupled in thermal communication with a heat source, and coupling a second end of the at least one heat pipe in thermal communication with an outer surface of an engine component that is upstream from the heat source.

In another aspect, an ice protection system for a turbine engine is provided. The ice protection system includes at least one heat pipe coupled in thermal communication between a heat source and an outer surface of at least one engine component. The ice protection system facilitates at least one of preventing and mitigating ice accretion across the engine component outer surface.

In a further aspect, a gas turbine engine is provided. The engine includes a stator assembly including an external surface, a heat source downstream from the stator assembly, and an ice protection system. The ice protection system includes at least one heat pipe coupled in thermal communication between the heat source and the stator assembly outer surface.

DETAILED DESCRIPTION OF THE INVENTION

Figure 1:
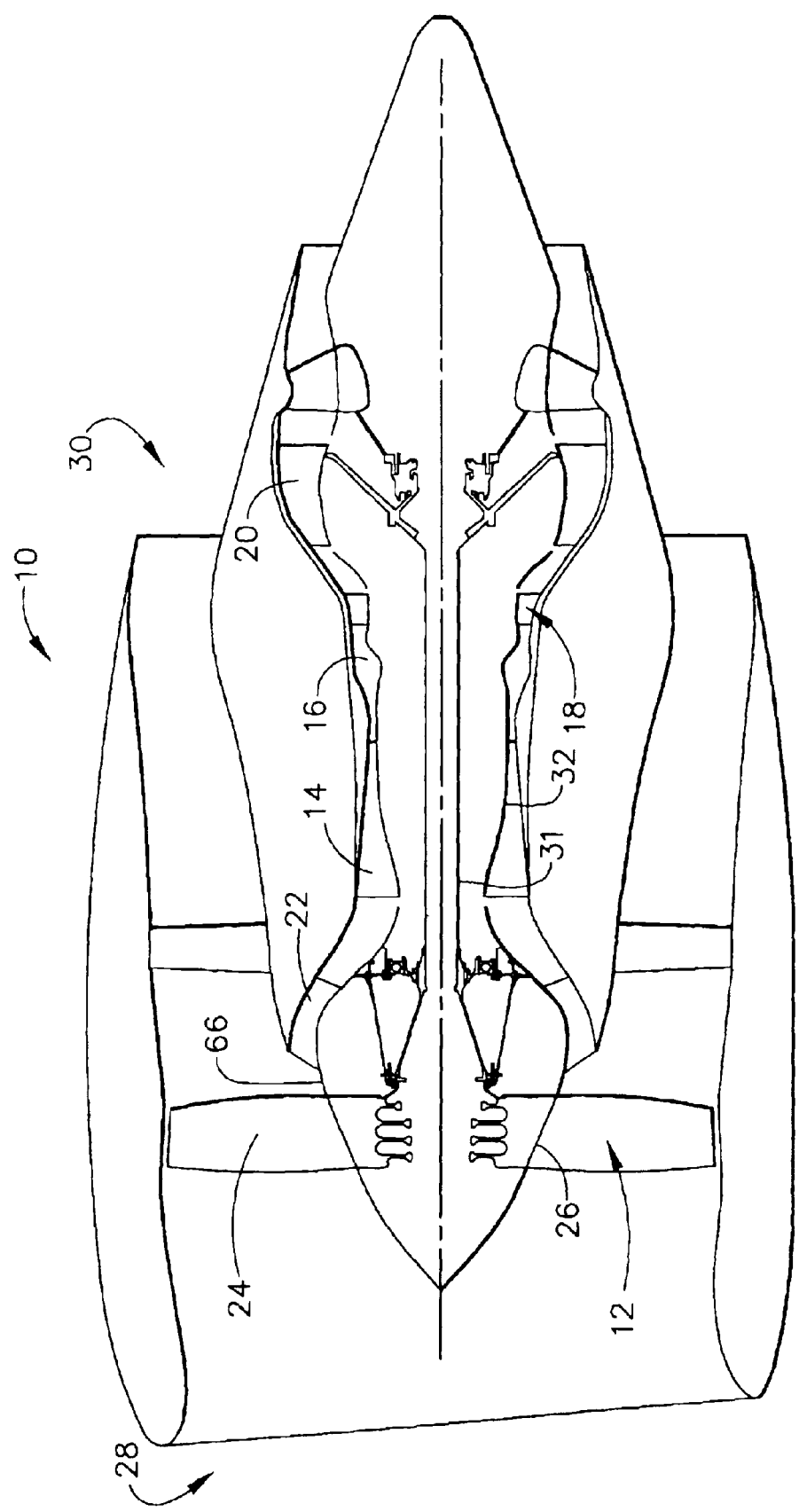
FIG. 1 is schematic illustration of a gas turbine engine.

FIG. 1 is a schematic illustration of a gas turbine engine 10 including a fan assembly 12, a high pressure compressor 14, and a combustor 16. Engine 10 also includes a high pressure turbine 18, a low pressure turbine 20, and a booster 22. Fan assembly 12 includes an array of fan blades 24 extending radially outward from a rotor disc 26. Engine 10 has an intake side 28 and an exhaust side 30. In one embodiment, the gas turbine engine is a GE90 available from General Electric Company, Cincinnati, Ohio. In an alternative embodiment, engine 10 includes a low pressure compressor. Fan assembly 12, booster 22, and turbine 20 are coupled by a first rotor shaft 31, and compressor 14 and turbine 18 are coupled by a second rotor shaft 32.

In operation, air flows through fan assembly 12 and compressed air is supplied to high pressure compressor 14 through booster 22. The highly compressed air is delivered to combustor 16. Hot products of combustion (not shown in FIG. 1) from combustor 16 drives turbines 18 and 20, and turbine 20 drives fan assembly 12 and booster 22 by way of shaft 31. Engine 10 is operable at a range of operating conditions between design operating conditions and off-design operating conditions.

Figure 2:
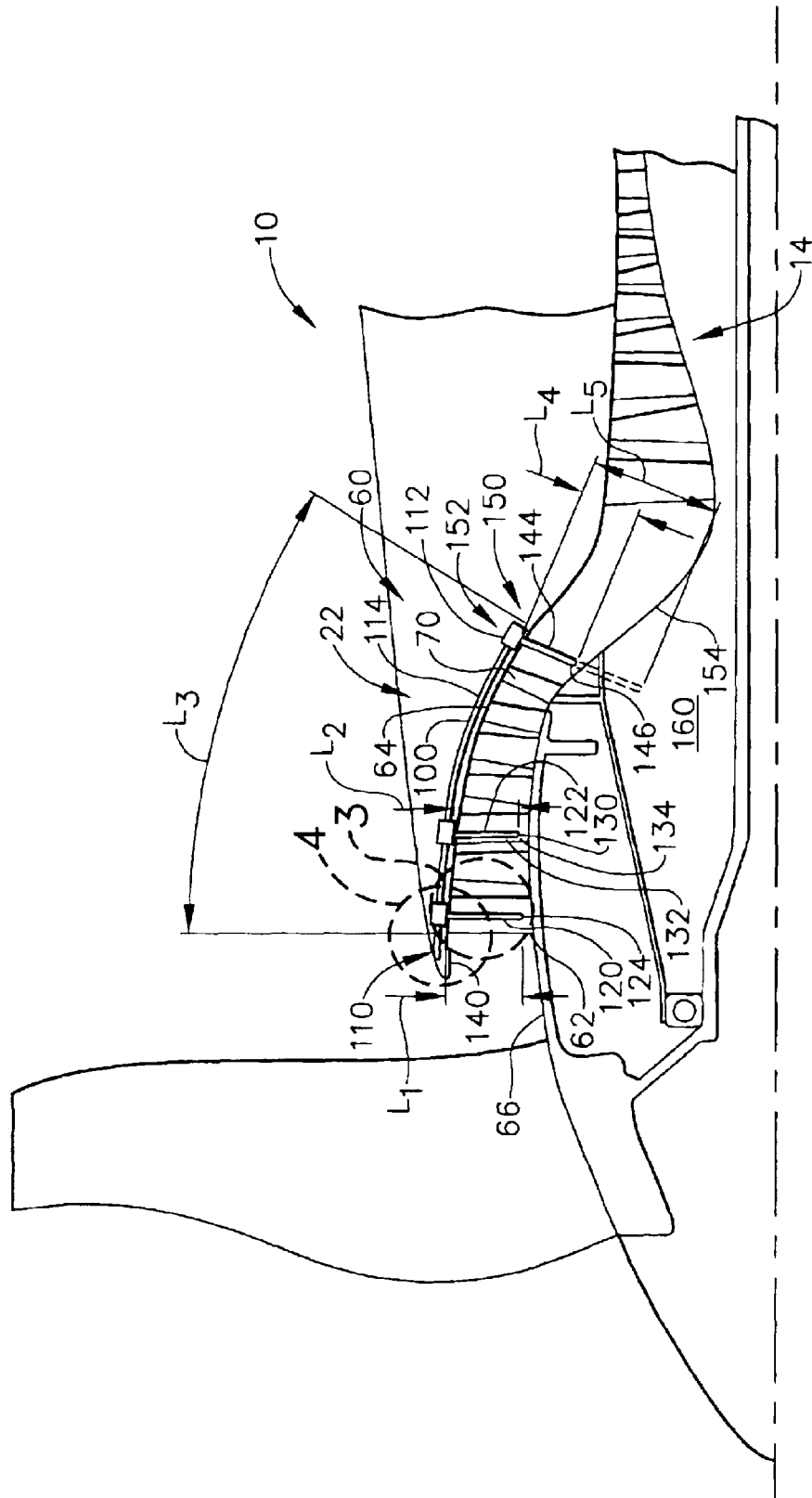
FIG. 2 is a schematic illustration of an ice protection system that may be used with the gas turbine engine shown in FIG. 1.
Figure 3:
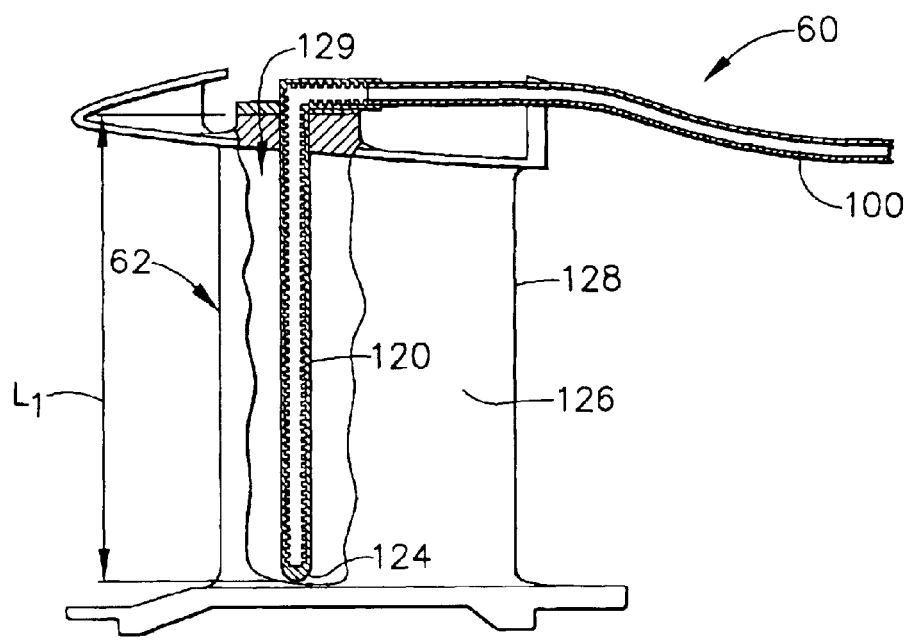
FIG. 3 is an enlarged illustration of a portion of the ice protection system shown in FIG. 2 and taken along area 3.
Figure 4:
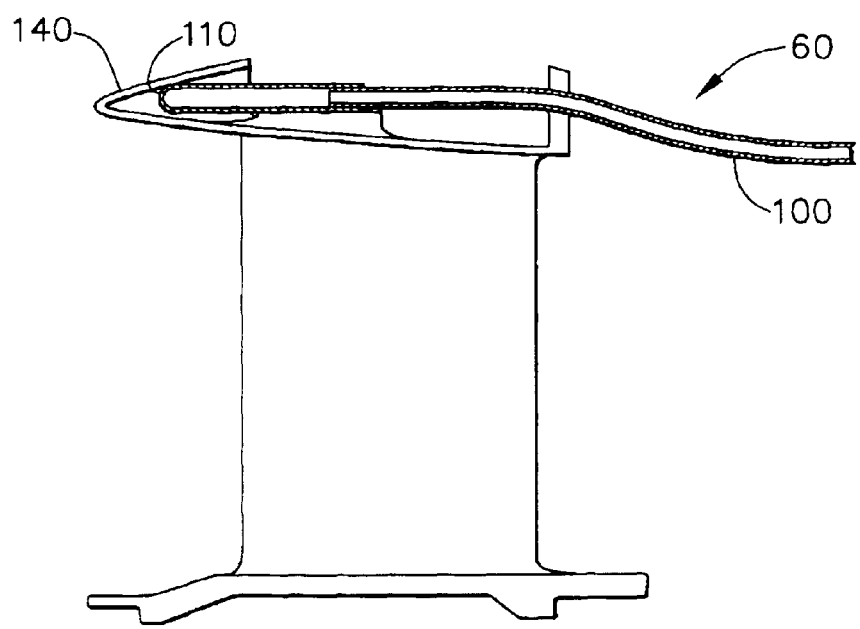
FIG. 4 is an enlarged illustration of a portion of the ice protection system shown in FIG. 2 and taken along area 4.

FIG. 2 is a schematic illustration of an ice protection system 60 that may be used with gas turbine engine 10. FIG. 3 is an enlarged illustration of a portion of ice protection system 60 and taken along area 3 (shown in FIG. 2). FIG. 4 is an enlarged illustration of a portion of ice protection system 60 and taken along area 4 (shown in FIG. 2).

Specifically, in this embodiment, ice protection system 60 facilitates preventing ice accretion and/or mitigates ice formation, along or within booster 22. More specifically, booster 22 includes a plurality of circumferentially-spaced inlet guide vanes (IGV) 62. IGV assemblies 62 extend between an outer structural casing 64 and a center hub 66, and channel airflow entering engine 10 downstream through booster 22. In one embodiment, booster 22 includes a plurality of struts (not shown in FIG. 2) which extend between outer structural casing 64 and center hub 66. In the exemplary embodiment, booster 22 also includes a plurality of outlet guide vane (OGV) assemblies 70 which extend between outer structural casing 64 and center hub 66. In an alternative embodiment, booster 22 does not include OGV assemblies 70. In a further embodiment, ice protection system 60 facilitates preventing ice accretion and/or mitigates ice formation, along or within fan assembly 12, such as within fan assembly outlet guide vane (OGV) assemblies (not shown).

In the exemplary embodiment, ice protection system 60 includes a plurality of heat pipes 100 that are spaced circumferentially around engine 10. Each heat pipe 100 functions as though it has an effective thermal conductivity that is several orders of magnitude higher than that of copper. More specifically, each heat pipe 100 uses a liquid that evaporates by absorbing the heat from a hot end. The vapor generated then travels through the center of heat pipe 100, or through a channel formed within heat pipe 100, and condenses at the cold end of heat pipe 100, thereby transferring heat to the cold end. A wick that extends from one end of the heat pipe to the other transports the condensed liquid back to the hot end by capillary action, thereby completing the circuit. In an alternative embodiment, ice protection system 60 includes only one heat pipe 100. Heat pipes 100 are circumferentially-spaced around center hub 66. More specifically, heat pipes 100 are coupled to outer casing 64 and radially outward from booster 22. In the exemplary embodiment, heat pipes 100 are identical. In an alternative embodiment, at least one heat pipe is different than the remaining heat pipes 100.

Each heat pipe 100 has an upstream end 110, a downstream end 112, and a body 114 extending therebetween. Body 114 is hollow and includes a cavity (not shown) defined therein by body 114. Body 114 is lined with a capillary structure or wick that is saturated with a volatile or working fluid. In an alternative embodiment, heat pipe upstream end 110 includes an arcuate manifold that extends at least partially circumferentially around engine 10.

In the exemplary embodiment, body 114 also includes a pair of forward heat sink extensions 120 and 122 that extend radially inward from body 114. Extension 120 has a length $L_1$ measured from body 114 to a radially inner end 124 of extension 120. In the exemplary embodiment, extension length $L_1$ enables extension 120 to extend at least partially through a booster inlet guide vane assembly 62, such that heat pipe extension 120 is positioned in thermal communication with an external surface 126 of a respective vane 128, and more specifically, extension 120 is positioned adjacent a leading edge 129 of vane 128.

Extension 122 has a length $L_2$ measured from body 114 to a radial inner end 130 of extension 122. In the exemplary embodiment, extension length $L_2$ enables extension 122 to extend at least partially through a booster stator assembly vane 132. More specifically, heat pipe extension 122 is positioned in thermal communication with an external surface 134 of vane 132.

Body 114 is flexible and has a length $L_3$ measured between respective upstream and downstream ends 110 and 112. In the exemplary embodiment, body length $L_3$ enables body upstream end 110 to be coupled to casing 64 such that upstream end 110 is adjacent a splitter 140 formed integrally with, and casing 64, and such that body downstream end 112 is secured downstream from booster 22. More specifically, body downstream end 112 is secured to casing 64 such that end 112 is intermediate booster 22 and compressor 14.

Heat pipe 100 also includes an aft heat pipe extension 144 that extends radially inward from body 114 at body downstream end 112. Extension 144 has a length $L_4$ measured from body 114 to an outer end 146 of extension 120. In the exemplary embodiment, extension length $L_4$ enables extension 144 to extend at least partially through a forward frame strut 150. Forward frame struts 150 are spaced circumferentially about engine 10 at an upstream end 152 of a transition duct 154 extending between booster 22 and compressor 14. In an alternative embodiment, extension 144 is suspended in the flow path defined within duct 154. In a further alternative embodiment, extension 144 is suspended in a gear box (not shown). In one embodiment, ice protection system 60 includes a plurality of heat pipes 100 coupled together in thermal communication. In another embodiment, each heat pipe 100 is formed from a serial assembly of several heat pipe sections with junctions and/or manifolds between adjacent sections to facilitate assembly and removal and/or replacement of ice protection system 60.

In an alternative embodiment, aft heat pipe extension 144 has a length $L_5$ measured from body 114 to extension inner end 146. Length $L_5$ is longer than length $L_4$ to enable aft heat pipe extension 144 to extend at least partially into a forward oil sump 160 rather than into forward frame struts 150.

During engine operation, engine 10 may be operated in atmospheric icing conditions and moreover, propulsive thrust may be demanded from engine 10 during such atmospheric conditions. As the engine is operated, operating temperatures within transition duct 154 and an operating temperature of forward frame struts 150 increases.

Heat pipe 100 combines two properties of physics: vapor heat transfer and capillary action. More specifically, when heat pipe extension 144 and heat pipe downstream end 112 are exposed to a heat source and is heated, the working fluid within each heat pipe 100 evaporates from liquid to vapor. The vapor flows through body 114 towards heat pipe upstream end 110 and extensions 120 and 122 wherein vapor heat energy is removed through extensions 120 and 122. More specifically, components housing extensions 120 and 122, and/or heat pipe upstream end 110, function as a heat sink and facilitate heat transfer to component external surfaces, such as surfaces 126 and 134, for example, that may be susceptible to ice accretion and/or formation. Alternatively, ice protection system facilitates mitigating ice formation across surfaces 126 and 134, for example, which may be susceptible to ice accretion and/or formation. Accordingly, the potential for engine stalls and/or engine flameouts caused from ingesting ice sheds is facilitated to be reduced.

As a result of the heat transfer between extensions 120 and 122 and the engine components, such as booster components 62 and/or 132, vapor within heat pipes 100 is condensed when the vapor heat transfer is complete. The capillary action returns the condensed fluid towards heat pipe downstream ends 112 to complete the heat transfer cycle.

In another embodiment, heat pipe upstream end 110 includes an arcuate manifold that extends at least partially circumferentially around engine 10. Accordingly, in this embodiment, the vapor flows through body 114 upstream and into the manifold which channels the vapor flow into a plurality of ends 110. Accordingly, a plurality of components, such as, but not limited to inlet guide vanes 62, or outlet guide vane assemblies 70 receive vapor heat energy substantially simultaneously from the same heat pipe 110.

Figure 5:
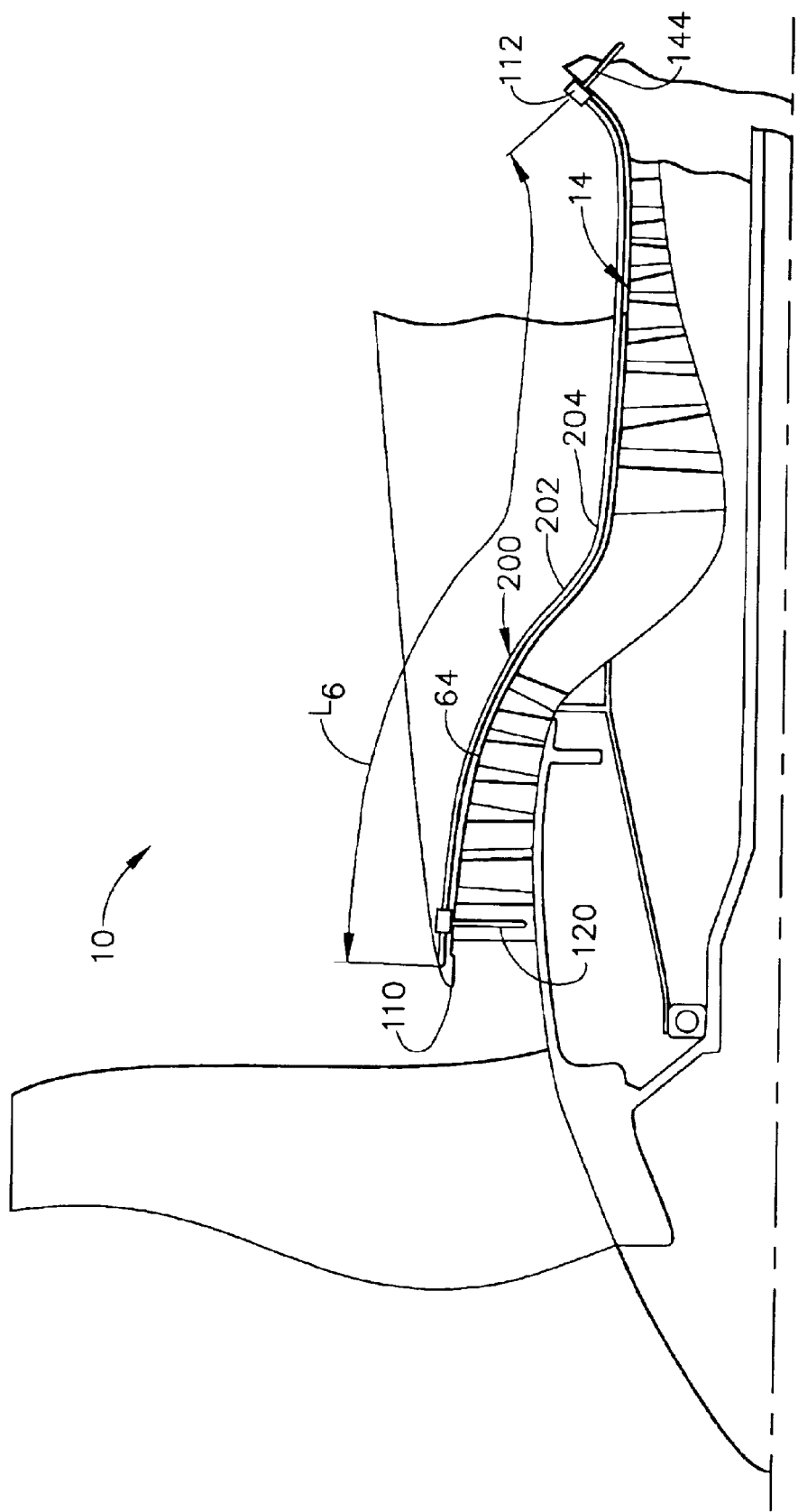
FIG. 5 is a schematic illustration of an alternative embodiment of the ice protection system shown in FIG. 2.

FIG. 5 is a schematic illustration of an alternative embodiment of an ice protection system 200. Ice protection system 200 is substantially similar to ice protection system 60 (shown in FIGS. 2 and 3) and components in ice protection system 200 that are identical to components of ice protection system 60 are identified in FIG. 4 using the same reference numerals used in FIGS. 2 and 3. Accordingly, ice protection system 200 includes a plurality of heat pipes 202 that are substantially similar to heat pipes 100 (shown in FIGS. 2 and 3). As described above, each heat pipe 202 functions as though its effective thermal conductivity is several orders of magnitude higher than that of copper. In an alternative embodiment, ice protection system 200 includes only one heat pipe 202. Heat pipes 202 are circumferentially-spaced around center hub 66 and are coupled to outer casing 64.

Each heat pipe 202 includes a body 204 extending between upstream and downstream ends 110 and 112, respectively. Body 204 includes forward heat sink extension 120, and aft heat pipe extension 144. Body 204 is flexible and has a length $L_6$ measured between respective upstream and downstream ends 110 and 112, that enables body upstream end 110 to be coupled to casing 64 such that upstream end 110 is adjacent casing upstream end 140, and body downstream end 112 to be secured adjacent to, or downstream from, compressor 14. More specifically, in the exemplary embodiment, body downstream end 112 is secured in thermal communication with a compressor discharge bleed air manifold. In an alternative embodiment, body downstream end 112 is secured in thermal communication with an environmental bleed air manifold. As a result, ice protection system 200 is exposed to higher temperatures at body downstream end 112 than ice protection system 60 is exposed.

During engine operation, ice protection system 200 operates similarly to ice protection system 60 to enable engine 10 to operate in atmospheric icing conditions.

The above-described ice protection system is cost-effective and highly reliable in facilitating the prevention of ice accumulation along exposed surfaces of the engine. More specifically, the heat pipes enable heat to be transferred from selected heat sources to selected components whenever the engine is operating and without requiring the use of an external control system. Moreover, no external initiation or modulation of heat flux is required with the above-described ice protection system. Furthermore, because compressor bleed air is not utilized, engine performance is not adversely affected by the ice protection systems described herein. As a result, an ice protection system is provided which facilitates enhanced compressor stall margin when the engine is operating in potential icing conditions, and thus eliminates compressor stall margin shortfalls that may occur following a compressor ice shed event, or when a reduced fuel schedule is used with the engine. By constantly supplying heat to the areas susceptible for ice accumulation, the ice protection system also facilitates avoidance of significant accumulation. Also, by applying heat to the interface between the engine surface (metal or composite) and the ice, the bond between the ice and the engine surface is weakened, thus facilitating shedding of the ice before it reaches any significant mass capable of causing an engine stall or flame out.

Exemplary embodiments of ice protection systems are described above in detail. The ice protection systems are not limited to the specific embodiments described herein, but rather, components of each system may be utilized independently and separately from other components described herein. For example, each ice protection system component can also be used in combination with other ice protection system components and with other turbine engines.

While the invention has been described in terms of various specific embodiments, those skilled in the art will recognize that the invention can be practiced with modification within the spirit and scope of the claims.

What is claimed is:

1. A method for assembling a turbine engine to facilitate preventing ice accumulation on the turbine engine during engine operation, the gas turbine engine including a fan assembly, a booster downstream from the fan assembly, and a high pressure compressor downstream from the booster, the booster including an inlet guide vane assembly, at least one splitter, and an outlet guide vane assembly, said method comprising:

coupling at least one heat pipe to the engine such that a first closed end of the at least one heat pipe is coupled in thermal communication with a heat source; and coupling a second closed end of the at least one heat pipe in thermal communication with and positioned within at least one of the inlet guide vane assembly and the outlet guide vane assembly that is prone to icing, such that fluid flows from the first end to the second end of the at least one heat pipe, and in an opposite flow direction from the second end to the first end of the at least one heat pipe through the at least one heat pipe to facilitate preventing ice accumulation on an outer surface of at least one of the inlet guide vane assembly and the outlet guide vane assembly that is prone to icing.

2. A method in accordance with claim 1 wherein coupling at least one heat pipe to the engine such that a first end of the at least one heat pipe is coupled in thermal communication with a heat source further comprises coupling the first end of the at least one heat pipe to at least one of an engine frame strut, an oil tank, a sump, and a compressor casing.

3. A method in accordance with claim 1 wherein coupling at least one heat pipe to the engine such that a first end of the at least one heat pipe is coupled in thermal communication with a heat source further comprises coupling the first end of the at least one heat pipe to at least one of an environmental bleed air manifold and a compressor discharge bleed air manifold.

4. A method in accordance with claim 1 wherein coupling a second end of the at least one heat pipe further comprises coupling the at least one heat pipe second end in thermal communication with at least a portion of an outer surface of an engine stator assembly.

5. A method in accordance with claim 1 wherein coupling a second end of the at least one heat pipe further comprises coupling the at least one heat pipe second end in thermal communication with at least a portion of an outer surface of an engine component such that heat transfer from the at least one heat pipe second end to the engine component outer surface facilitates preventing ice accretion across the outer surface of the engine component.

6. An ice protection system for a turbine engine, said ice protection system comprising at least one heat pipe coupled in thermal communication between a heat source and an outer surface of at least one engine component that is prone to icing, the turbine engine including a fan assembly, a booster downstream from the fan assembly, and a high pressure compressor downstream from the booster, the booster including an inlet guide vane assembly, at least one splitter, and an outlet guide vane assembly, said at least one heat pipe comprises a first closed end, a second closed end positioned within at least one of an inlet guide vane assembly and an outlet guide vane assembly, and a body extending therebetween, said body has a cross-sectional flow area that is sized to enable fluid to flow in a first direction from the first end to the second end therethrough and in a second direction from the second end to the first end therethrough during engine operation, said ice protection system facilitates at least one of preventing and mitigating ice accretion across an outer surface of at least one of the inlet guide vane assembly and the outlet guide vane assembly that is prone to icing.

7. An ice protection system in accordance with claim 6 wherein said heat source comprises at least one of an engine frame strut, an oil tank, a sump, and a compressor casing.

8. An ice protection system in accordance with claim 6 wherein said heat source comprises at least one of an environmental bleed air manifold and a compressor discharge bleed air manifold.

9. An ice protection system in accordance with claim 6 wherein said at least one heat pipe is coupled in thermal communication to an outer surface of at least one of an inlet guide vane assembly, a splitter, and an outlet guide vane assembly.

10. An ice protection system in accordance with claim 6 wherein said at least one heat pipe is coupled in thermal communication to an outer surface of at least a portion of an engine stator assembly.

11. An ice protection system in accordance with claim 6 wherein said at least one heat pipe comprises a plurality of heat pipes coupled together in thermal communication.

12. An ice protection system in accordance with claim 6 wherein said at least one heat pipe facilitates reducing at least one of engine stalls and engine flameouts.

13. A gas turbine engine comprising:
a fan assembly, a booster downstream from the fan assembly, and a high pressure compressor downstream from the booster, the booster including an inlet guide vane assembly, at least one splitter, and an outlet guide vane assembly,
a stator assembly comprising an external surface of at least one of the outlet guide vane assembly and inlet guide vane assembly that is prone to icing;
a heat source downstream from said stator assembly; and an ice protection system comprising at least one heat pipe coupled in thermal communication between said heat source and said stator assembly outer surface, said at least one heat pipe comprises a first closed end, a second closed end positioned within at least one of an inlet guide vane assembly and an outlet guide vane assembly, and a body extending therebetween, said body has a cross-sectional flow area that is sized to enable fluid to flow in a first direction from the first end to the second end therethrough and in a second direction from the second end to the first end therethrough during engine operation, said ice protection system facilitates at least one of preventing and mitigating ice accretion across the outer surface of at least one of the inlet guide vane assembly and the outlet guide vane assembly that is prone to icing.

14. A gas turbine engine in accordance with claim 13 wherein said stator assembly comprises at least one of an inlet guide vane assembly, a splitter, and an outlet guide vane assembly.

15. A gas turbine engine in accordance with claim 13 wherein said at least one ice protection system heat pipe comprises a plurality of heat pipes coupled together in thermal communication.

16. A gas turbine engine in accordance with claim 13 wherein said ice protection system facilitates reducing at least one of engine stalls and engine flameouts.

17. A gas turbine engine in accordance with claim 13 wherein said heat source comprises at least one of an engine frame strut, an oil tank, a sump, and a compressor casing.

18. An ice protection system in accordance with claim 13 wherein said heat source comprises at least one of an environmental bleed air manifold and a compressor discharge bleed air manifold.

* * * * *